United States Patent [19]

Sortwell, III

[11] 4,199,603

[45] Apr. 22, 1980

[54] PRODUCTION OF COATED FROZEN FISH OR OTHER COMESTIBLE

[75] Inventor: Daniel R. Sortwell, III, Rocky River, Ohio

[73] Assignee: SCM Corporation, New York, N.Y.

[21] Appl. No.: 933,180

[22] Filed: Aug. 14, 1978

[51] Int. Cl.² .................. A23L 1/176; A23B 4/10; A23B 7/16

[52] U.S. Cl. ........................... 426/92; 426/96; 426/99; 426/100; 426/102; 426/243; 426/293; 426/296; 426/104; 426/289

[58] Field of Search .............. 426/92, 96, 99, 100, 426/102, 104, 289, 293, 296, 302, 305, 307, 241-243, 94

[56] References Cited

U.S. PATENT DOCUMENTS

| | | | |
|---|---|---|---|
| 2,910,370 | 10/1959 | Rogers et al. | 426/293 X |
| 3,586,512 | 6/1971 | Mancuso et al. | 426/289 X |
| 3,843,827 | 10/1974 | Lee et al. | 426/302 X |
| 3,852,501 | 12/1974 | Fazzina et al. | 426/293 |
| 4,068,009 | 1/1978 | Rispoli et al. | 426/293 X |

*Primary Examiner*—Steven L. Weinstein
*Attorney, Agent, or Firm*—Richard H. Thomas

[57] ABSTRACT

Frozen food products, such as fish, poultry and vegetable frozen products, suitable for micro-wave or oven cooking, which when cooked resemble in taste, texture and appearance fat-fried products, are prepared by coating frozen portions of said products with an edible oil containing a moisture absorbing substance such as pregelatinized starch, and then applying to the coated portions finely divided hygroscopic, crisp particulate, such as toasted bakery, cereal or carbohydrate particulate, capable on cooking of giving the appearance of a fat-fried product. The dilatometric profile of the edible oil is critical, and is such that the oil is fluid at room temperature but has a plastic consistency at the temperature of the frozen portions.

12 Claims, No Drawings

PRODUCTION OF COATED FROZEN FISH OR OTHER COMESTIBLE

The present invention relates to novel frozen comestible products suitable for micro-wave or oven cooking, which when cooked are organoleptically similar or superior, in texture and appearance, to a fat-fried comestible product, and to the method of preparation of the same.

The present invention will be particularly described with respect to frozen fish products, but it will be apparent to those skilled in the art that the present invention has other applications, for instance the preparation of frozen poultry and vegetable products, which when micro-wave or oven cooked resemble fat-fried such products.

For purposes of the present application, the term "fat-fried" refers both to deep fat-fried products or pan-fried products.

The present invention is limited to frozen comestible products, and is limited to products suitable for micro-wave or oven cooking. The present invention is also limited to the preparation of products which when cooked resemble fat-fried products.

BACKGROUND OF THE PRESENT INVENTION

Frozen comestible products such as fish, poultry and vegetables suitable for fat-frying are commonly batter coated with a flour/starch batter and then breaded and packaged. On cooking by frying, a crisp and browned, continuous outer coating on the surface of the cooked product is obtained.

The problem with attempting to micro-wave cook such batter coated frozen comestibles is that they have a high water content and lose substantial amounts of free water in the cooking step. During fat-frying, the temperatures of cooking are sufficient to drive this water off. However, during micro-wave cooking, the cooking temperatures and time are less and the "cook-out juice" saturates a conventional breaded batter coating making it mushy and giving it the taste of flour paste.

Still micro-wave cooking requires substantially less cooking time and effort. This convenience makes the availability of frozen condiments, suitable for micro-wave cooking, of substantial importance to the ultimate consumer.

It is known to prepare coated, frozen, comestible products suitable for oven cooking, which when cooked have a crisp, browned outer surface. However, in order to obtain an appearance and texture resembling that of a deep-fried comestible product, it is necessary to subject the frozen portions to a pre-frying step prior to packaging. Specifically, frozen portions, cut from fish blocks, are first enrobed with a flour/starch batter, followed by application of a breading material. The frozen portions are then subjected to about thirty seconds deep-fat flash frying at about 390° F., in a continuous fat fryer, followed by re-freezing at about −20° F. for about twenty minutes, and then packaging. The pre-frying time is sufficient to at least partially cook the coating ingredients. In the absence of pre-frying, the oven preparation time would be insufficient, and the final product would have a coating which as with the micro-wave cooked product is mushy and tastes like flour paste.

A primary disadvantage with the above process for the preparation of pre-cooked frozen comestibles, suitable for oven cooking, is that the pre-frying is expensive and adds significantly to the cost of the product. In addition, even though it is an object only to partially cook the coating, some thawing and cooking of the fish itself occurs. It is estimated that this is sufficient to effect a moisture loss of about 10–12% in the fish and a corresponding economic loss to the producer of the pre-fried product.

Prior U.S. Pat. No. 3,843,827 describes coating a foodstuff such as meat, fish, or vegetable with a batter comprising a blend of raw egg and milk or water with a dry mix of wheat flour, shortening, cornstarch and pregelatinized waxy-maize starch, and then rolling or otherwise coating the batter-coated foodstuff with a dry mix comprising cereal fines, pregelatinized waxy-maize starch, shortening and wheat flour. On baking, it is indicated that the final product possesses a deep fat-fried texture and appearance. No mention is made in this patent of the use of a frozen foodstuff as the meat, fish or vegetable source.

Prior U.S. Pat. No. 4,068,009 describes coating a foodstuff such as meat, fish or vegetable with a batter, similar to that of U.S. Pat. No. 3,843,827, and then applying to the batter a bread crumb coating composition, the bread crumbs having a critical particle size and an edible oil applied to the surface thereof. As in the '827 patent, no mention is made in this patent of using a frozen foodstuff as the meat, fish or vegetable source.

Both patents employ as the initial coating a conventional batter, and as indicated above, applicant's experience has been that, particularly in micro-wave cooking, a mushy texture and uncooked appearance results. In U.S. Pat. No. 4,068,009, crispness, as compared to a mushy texture, is alleged as an advantage. However, this is with conventional baking, and it is doubtful if such crispness would result from micro-wave cooking. In addition, the advantages are alleged to be attributable to the application of a heavier than conventional coat and interweaving of the bread crumb particles in the coat. Such a heavy batter coat tends to mask the flavor and texture of the fish such that a consumer experiences more batter than fish.

BRIEF DESCRIPTION OF THE PRESENT INVENTION

In the present invention, food products, such as frozen fish, poultry and vegetable products, suitable for micro-wave or oven cooking, which when cooked are organoleptically similar or superior in texture and appearance to fat-fried products, are prepared by coating frozen portions of said products with a pre-coat comprising an edible oil and a moisture absorbing substance such as pregelatinized starch, and then applying to the pre-coated frozen portions a finely divided, dried, crisp particulate, such as toasted bakery, cereal, grain or seed particulate, capable, on cooking, of giving the desired texture and appearance.

The composition of the edible oil, in the pre-coat, is critical in the practice of the present invention. It should be sufficiently fluid at room temperature to be applicable to the surface of the frozen comestible, and to develop on such surface a thin film substantially completely and uniformly enrobing the comestible. Preferably, the term "fluid" means sprayable, such that the oil, when blended with the moisture absorbing substance, is capable of being spray applied to the frozen comestible using ordinary spray application equipment. At the same time the oil should have a sufficiently high viscosity to adhere to the frozen comestible and to serve as an effective carrier for the moisture absorbing substance (i.e., to form a stable dispersion).

To meet both criteria, the oil preferably has a dilatometric profile of

| Temperature, °F. | Approximate Solid-Fat Index |
| --- | --- |
| 50 | 5–20 |
| 70 | 2–10. |

At the surface temperature of the frozen comestible, for instance 10°–15° F., the consistency of the edible oil should be plastic (defined as approximately intermediate hard and fluid). It should have a sufficiently high solids content to serve as an effective binder for the dry particulate when the latter is subsequently applied to the comestible portions. Using a penetrometer, it preferably has a penetrometer reading at 0° F. to 15° F. roughly comparable to that of butter at about refrigeration temperature (40° F.).

Preferably the edible oil has a solid-fat index at body temperature, about 98° F., not substantially greater than about 7, preferably less than about 5, to avoid an oily after-taste on eating; and at 104° F. a solid-fat index of about 2–5.

The amount of the pre-coat applied to the frozen comestible portions should be sufficient to completely enrobe such portions, but at the same time should be limited to that amount which provides a thin film on the portions.

The edible oil and moisture absorbing pre-coat sets up on the surface of the frozen comestible forming a semi-permeable water absorbing membrane which serves as a barrier to the escape of excessive moisture during cooking. That free moisture which is released from the comestible is largely taken up by the moisture absorbing substance. The dry crisp particulate is sufficiently dry, at the beginning of cooking, to absorb whatever free moisture is left without resulting in a coating which is less than crisp.

The proportion of moisture absorbing substance to edible oil in the pre-coat is dependent in part on the type of substance used. One skilled in the art can determine the specific amount necessary to absorb free water released, while at the same time retaining a desired low viscosity, for instance for sprayability of the pre-coat formulation. In the case of pregelatinized starch, of commercially available normal particle size, it was found that about 15–25% starch, based on the total weight of the pre-coat, provided an acceptable weight range. A preferred weight range is 20–25%. In this weight range, the starch also is sufficiently coated by the edible oil to prevent significant moisture pick-up by the starch during ordinary handling. The moisture absorbing substance should be sufficiently finely divided (in small particle size form) to avoid adversely affecting the appearance of the final product when cooked.

DETAILED DESCRIPTION OF THE PRESENT INVENTION

The fish, poultry or vegetable source for the comestible product of the present invention must be in a frozen state. Any conventional commercial method for forming or freezing the comestible can be used. Traditionally, the temperature of the comestible source will be about 10° to about 15° F., although this obviously can vary substantially, depending upon the particular product involved, for instance from about −10° up to about 30° F. Whereas the present invention is particularly adapted to the use of frozen fish portions, the invention is also applicable to the production of products from other high moisture containing comestibles such as eggplant, or de-skinned and boned poultry pieces. The present invention is particularly applicable to high moisture frozen comestibles which on cooking lose a large amount of free water.

Any bland edible vegetable oil, or blend of a vegetable oil with an animal or vegetable fat, which at room temperature is fluid, as defined above, but which solidifies at the surface temperature of the comestible source to a plastic consistency, as defined, can be used. To further define the present invention, the oil at room temperature (70° F.) preferably has a viscosity in the range of about 700–1,500 centipoises (using a Brookfield Viscometer, No. 3 spindle at 60 RPM). At less than about 700 centipoises, the oil may be insufficiently viscous to adhere to the frozen comestible portions, and to serve as an effective carrier for the moisture absorbing substance. At more than about 1,500 centipoises, the oil when blended with the moisture absorbing substance may be too viscous to be sprayable using ordinary spray application equipment.

Suitable such oils and fats include partially hydrogenated vegetable oils, such as corn oil, soybean oil, peanut oil, olive oil, palm kernel oil, cottonseed oil, and animal fats such as lard and tallow, and blends of the same. One suitable oil is B-40 base oil, a partially hydrogenated soybean oil manufactured by the Durkee Foods Division of SCM Corporation. This oil has a Wiley Melting Point of about 83.2° F., an IV of about 95 and an SFI as follows:

| Temperature, °F. | Approximate Solid-Fat Index |
| --- | --- |
| 50 | 11.7 |
| 70 | 3.3 |
| 80 and above | 0 |

A particularly preferred oil is Dress-All (trademark, SCM Corporation), a partially hydrogenated soybean oil, containing about 2–5% stearine. This oil has a Wiley Melting Point of about 107° F.; a dilatometric profile as follows

| Temperature, °F. | Approximate Solid-Fat Index |
| --- | --- |
| 50 | 10 max. |
| 70 | 8 |
| 92 | 3–6 |
| 104 | 2–5; | an IV (Iodine Value) of about 97–102; and a viscosity at room temperature (about 70° F.) as measured on a Brookfield Viscometer at 70° F., using a No. 3 spindle, at 60 RPM, of about 1,200 maximum. The solid-fat index at 0° F. to 15° F. is estimated to be in the range of about 30–50. At 0° F., a penetrometer test, using a GCA Precision Scientific Penetrometer, and ASCS Method Cc 16–60, with an ASTM Designated Cone D-5, gave a penetration reading of 6.5 millimeters. This penetration might be considered roughly comparable to that obtainable with butter at refrigeration temperature (about 40° F.).

B-40 base oil at 0° gives a penetration reading of 3.2 millimeters.

Another suitable oil would be a pourable margarine, which would have consistencies at 70° F., body temperature, and below freezing similar to Dress-All.

A preferred moisture absorbing substance is pregelatinized waxy-maize starch. One particularly suitable such starch is Dura-jel (trademark, A. E. Staley Manufacturing Co.), a precooked, waxy-maize starch in which the water has been evaporated to yield a dry hygroscopic powder which is bland in flavor. Dura-jel contains about 5% moisture.

Other suitable starches, all marketed by A. E. Staley Manufacturing Co., are Nu Col (pregelatinized tapioca starch); Nu Col 4227 (pregelatinized corn based starch); Binasol 81 (precooked tapioca); Redisol 88 (precooked tapioca); and Redisol 313 (precooked potato).

Other suitable moisture absorbing substances include microcrystalline cellulose (Avicel RC 591, trademark FMC Corporation); proteins such as soy protein isolate (Supro 620, trademark Ralston Purina Company), sodium alginate, and soy albumen; gums such as carboxymethyl cellulose or methyl cellulose (methocel A4M, trademark Dow Chemical Company); whey protein; and hydrolyzed vegetable protein such as HVP 3H3-4 (trademark, Nestle Company). Tests using the above moisture absorbing substances showed that best results, with regard to coating integrity and cohesiveness, were obtained with proteins such as gelatin or soy albumen or gums such as methyl cellulose or carboxymethyl cellulose. However, overall criteria appeared to be best met with pregelatinized waxy-maize starch.

It is important that the moisture absorbing substance be uniformly dispersed in the oil to prevent clumping of the same, particularly when applied to the surface of the frozen comestible. This can be accomplished by ordinary mixing and blending techniques and apparatus.

The dry particulate applied to the coated frozen comestible should, on micro-wave cooking or oven cooking, provide an appearance and texture organoleptically similar or superior to that achieved by a conventional breaded batter coating obtained by fat-frying or deep fat-frying. Any number of suitable particulates are available. Such particulate should have a low moisture content such that even with the release of additional moisture from the frozen comestible, beyond that captured by the moisture absorbing ingredient, the particulate remains crisp and free from mushiness.

Preferably the particulate is pre-browned to provide the browned cooked appearance conventionally obtained in fat-frying. Preferably the particulate has a variegated or non-uniform appearance and shape, one that increases surface area and thus crispness of the product. Also the particulate should be applicable to the comestible using standard breading application equipment.

One suitable particulate is toasted bread crumbs, specifically a product known as Oriental- or Japanese-style toasted bread crumbs marketed by a number of manufacturers. A specific such product is "Japanese-style" bread crumbs marketed by Newly Weds Foods, Inc. These bread crumbs characteristically have an irregular or jagged shape which improves their adherence to the surface of the frozen comestible, by binding to the oil, and adds surface area increasing the crispness of the final product. The moisture content of the bread crumbs is important, and preferably is less than about 15%, with an optimum range being about 5% to 10%. The particle size of the bread crumbs also is important, in the sense that they should be sufficiently finely divided to provide a texture and appearance organoleptically similar or superior to that of a conventional breaded fat-fried product. Preferably the bread crumbs have a particle size such that less than about 40% by weight is retained on a USS 8 mesh screen, less than about 50% on a USS 14 mesh screen, and less than about 30% on a USS 20 mesh screen, about 5-15% passing through the USS 20 mesh screen. Data for the Newly Weds product are:

| Particle Size | Distribution |
|---|---|
| Screen, USS | |
| on 5 | 1.6% |
| on 8 | 29.9% |
| on 14 | 36.3% |
| on 20 | 21.9% |
| Through 20 | 10.3% |

The Newly Weds toasted bread crumbs have a moisture content less than about 7%.

By using toasted bread crumbs, the consumer need not rely on the oven or micro-wave cooking for browning of the surface of the final product.

Other suitable low moisture particulates are comminuted dried cornflakes, comminuted dehydrated toasted potato pieces, toasted dehydrated puffed rice, ground toasted sesame seed, toasted whole rolled oats, and de-fated soy grits.

The following Examples are illustrative of the concepts of the present invention.

EXAMPLE 1

Frozen cod portions were first sprayed with the following mixture:

| Durkee Liquid Dress-All | 78% |
|---|---|
| Staley Dura-jel Starch | 22% | the amount being the minimum necessary to provide a thin film completely enrobing such portions. After coating with the above mixture, the fish portions were coated with the following bread crumb mixture;

| Newly Weds dark toasted Japanese bread crumbs 6001A | 89.9% |
|---|---|
| Nestle Seafood Base 85 (flavor) | 4.0% |
| Granulated sugar | 2.0% |
| Granulated salt | 2.0% |
| Coarse ground pepper | 0.9% |
| Grated lemon peel | 0.7% |
| Parsley flakes | 0.5% |
| | 100.0% | and then packaged. These steps were carried out on an automatic production line for breading and packaging frozen fish portions. All of the steps were carried out at ambient temperatures and at relatively high production speeds of about 4,000 to about 9,000 pounds per hour. About 30 to 40 seconds elapsed during product travel between the last coating station and the first packing station. It was found that the vegetable oil solidified at a sufficiently high rate to provide good binding strength to the bread crumb mixture in this time span. The bread crumb mixture adhered well to the frozen cod portions during the packing and associated handling steps.

Subsequently, the frozen cod portions were cooked in a micro-wave oven to an internal temperature of about 160° F., and were then served to a taste test panel of 30 people. The product was determined to have highly acceptable appearance, flavor and texture. No mushiness of the coating was reported.

By contrast, products tested without the presence of pregelatinized starch, or using ordinary bread crumbs as compared to toasted bread crumbs, exhibited mushiness and an uncooked appearance.

EXAMPLE 2

Frozen cod portions coated as in Example 1 were cooked in a convection oven of the type used in school and hospital mass feeding systems. The cooking time was 17 minutes at about 400° F. The convection oven moves forced heated air, driven by suitable fans, rapidly heating the fish portions.

For purposes of comparison, commercially available pre-cooked batter and breaded fish portions were similarly cooked in the same convection oven.

The following organoleptic differences were noted between the two kinds of fish portions. The texture of the coating on the pre-cooked fish portion was doughy and pasty whereas the texture of the coating on the fish portions prepared in accordance with the concepts of the present invention was crisp and crunchy. In addition, the appearance of the coating on the pre-cooked fish portions was that of a manufactured product (i.e., flat, uniform, and smooth) whereas the fish portions prepared in accordance with the concepts of the present invention had a more variegated surface, particularly with respect to particle size and brown shading. It was also noted that the fish portions prepared in accordance with the concepts of the present invention had a more moist texture indicating a greater retention of moisture, by comparison with the pre-cooked fish portions.

A number of advantages accrue from the process of the present invention over the conventional process involving pre-cooking the coated and breaded frozen fish portions. Capital costs are substantially reduced by the elimination of the continuous fryer and continuous freezer conventionally required. In addition, the conventional frying step results in the extraction of spice oils and other oil-soluble flavors, and volatilization of certain flavor constituents from the coating, due to contact with the frying oil (at about 390° F.). Avoidance of this permits greater flexibility in flavoring the coating and the option of producing coated fish portions with many different flavor profiles. Still further, it is believed that the conventional pre-cooking causes some loss of water-soluble proteins and other valuable nutrients (in addition to the loss of water noted above and economic loss to the manufacturer).

Suitable convection ovens useful in cooking fish portions of the present invention include one manufactured by Vulcan-Hart of Louisville, Ky.; and Cook-N-Hold Convection Ovens marketed by General Electric Corporation.

It may be desirable to apply initially to the surface of the frozen comestible a conventional starch/flour-water batter. This can enhance the adherance of the pre-coat and particulate coat of the present invention to the comestible.

What is claimed is:

1. A process for preparing coated comestibles of frozen portions of said comestibles which when cooked by micro-wave or oven cooking have a texture and appearance organoleptically similar or superior to that of conventional batter coated and breaded fat-fried such comestibles, comprising the steps of applying to the surface of frozen portions of such comestibles, in sufficient amount to enrobe the same, a thin film of an edible oil having uniformly and stably dispersed therein a solid, edible, moisture absorbing substance;

said edible oil having a dilatometric profile such that it quickly becomes plastic in consistency at the temperature of the frozen comestible portions; and uniformly applying to the coated frozen portions a crisp, relatively dry particulate adapted to provide, on micro-wave or oven cooking, said desired texture and appearance.

2. The process of claim 1 wherein said edible oil has the following dilatometric profile

| Temperature, °F. | Approximate Solid-Fat Index |
|---|---|
| 50 | 5-20 |
| 70 | 2-10 | said thin film being applied by spraying.

3. The process of claim 2 wherein said edible oil has a solid-fat index at 98° F. not substantially greater than about 5.

4. The process of claim 3 wherein said frozen comestible portions are frozen fish.

5. The process of claim 4 wherein said moisture absorbing substance is pregelatinized waxy-maize starch.

6. The process of claim 5 wherein said particulate is toasted bread crumbs in finely divided irregularly shaped form.

7. The product prepared by any of the processes of claims 1-6.

8. A process for preparing a coated fish product of frozen fish portions which when cooked by micro-wave or oven cooking has a texture and appearance organoleptically similar or superior to that of a conventional batter coated and breaded fat-fried fish porduct, comprising the steps of spray applying to said frozen fish portions, in sufficient amount to enrobe such portions, a pre-coat comprising a partially hydrogenated vegetable oil and uniformly and stably dispersed therein about 3-5% stearine and a solid edible moisture absorbing substance, present in the proportion of about 15-25%, based on the weight of said pre-coat;

the amount of said pre-coat being sufficient to form a thin film on the surface of said frozen fish portions;

said vegetable oil having a dilatometric profile of

| Temperature, °F. | Approximate Solid-Fat Index |
|---|---|
| 0-15 | 30-50 |
| 50 | 5-20 |
| 70 | 2-10 |
| 98 | 7 max. |
| 104 | 2-5; | then applying to said coated frozen portions a layer of crisp uniformly relatively dry toasted particulate adapted to provide, on micro-wave or oven cooking, said desired texture and appearance.

9. The process of claim 8 wherein said moisture absorbing substance is pregelatinized waxy-maize starch.

10. The process of claim 9 wherein said particulate is toasted bread crumbs in finely divided irregularly shaped form.

11. The process of claim 10 wherein said edible oil has a viscosity of about 700–1,500 centipoises at 70° F. using a Brookfield Viscometer, No. 3 spindle, at 60 RPM.

12. The product prepared by any of the processes of claims 8–11.

* * * * *